United States Patent [19]

Sevick

[11] Patent Number: 4,825,708
[45] Date of Patent: May 2, 1989

[54] FIBER OPTIC VELOCITY SENSOR/FLOW METER

[76] Inventor: Peter M. Sevick, 12126 Misty Moss La., Houston, Tex. 77070

[21] Appl. No.: 109,392

[22] Filed: Oct. 19, 1987

[51] Int. Cl.$^4$ .............................................. G01F 1/06
[52] U.S. Cl. .................. 73/861.77; 73/861.87
[58] Field of Search ........... 73/861.77, 861.78, 861.87, 73/861.88, 187; 413/7; 416/85, 197 A

[56] References Cited

U.S. PATENT DOCUMENTS

| | | | |
|---|---|---|---|
| 2,723,562 | 11/1955 | Lutz et al. | 73/861.77 |
| 3,706,224 | 11/1972 | Overs | 73/187 |
| 4,172,381 | 10/1979 | Aigner | 73/861.87 |
| 4,206,637 | 6/1980 | Pankonien | 73/187 |
| 4,433,583 | 2/1984 | Kirk | 73/861.77 |

FOREIGN PATENT DOCUMENTS 0194316  10/1985  Japan .............................. 73/861.87

Primary Examiner—Herbert Goldstein

[57] ABSTRACT

An optical fiber/paddle wheel fluid velocity sensor is provided which has application as a boat speed sensor and a fluid flow meter as well as other applications. The paddle wheel may be of integral construction and incorporates a plurality of T-shaped paddle blades which are disposed in some substantially parallel, spaced relation with an axial shaft portion thereof. Each of the blades is inclined and offset with respect to the axis of rotation. Each of the paddle blade elements includes a signal interrupter projection capable of passing between closely spaced aligned optical fibers to thus interrupt the light signal therebetween and provide for multiple direct digital signal pulses that may be electronically processed to represent the velocity of fluid flow.

17 Claims, 2 Drawing Sheets

U.S. Patent    May 2, 1989    Sheet 1 of 2    4,825,708
FIG. 1
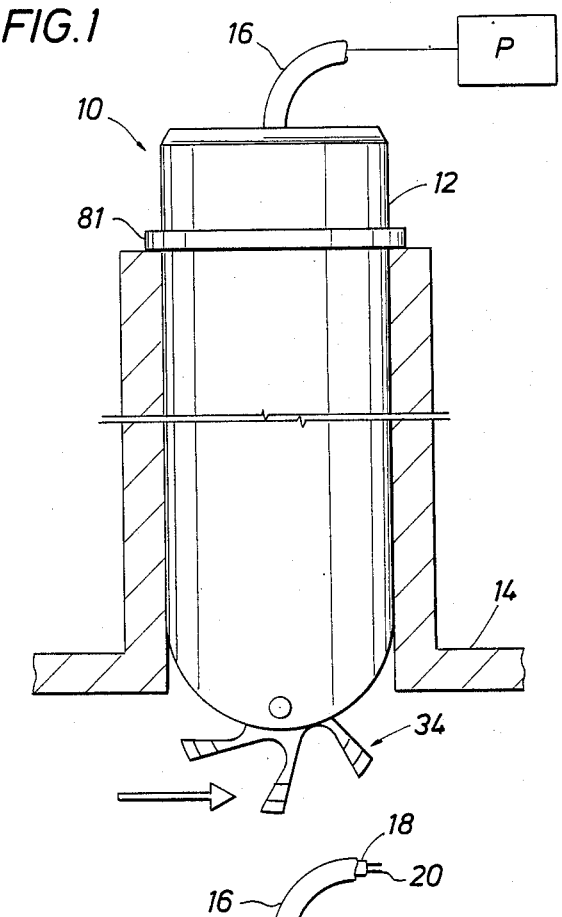
FIG. 2
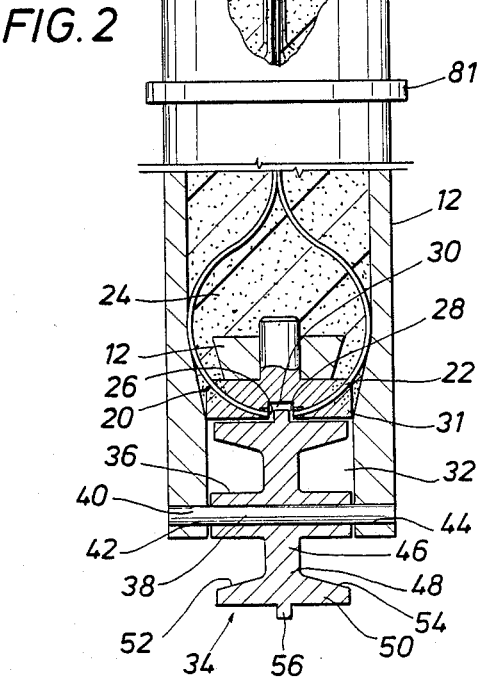
FIG. 4
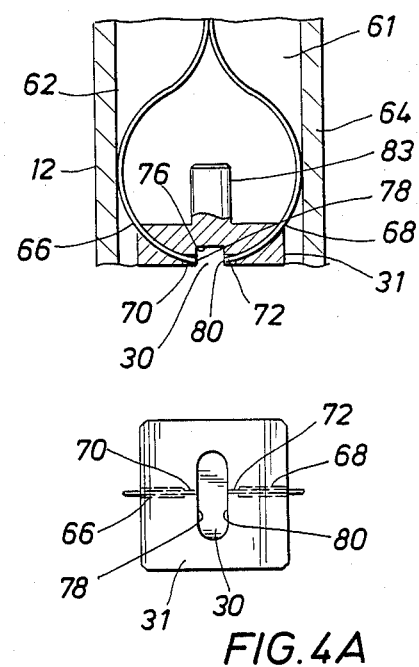
FIG. 4A
FIG. 3
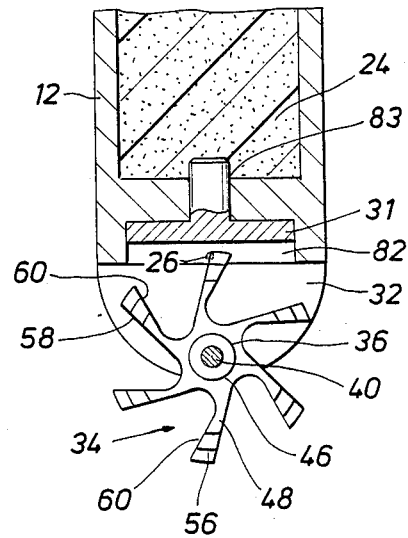

FIBER OPTIC VELOCITY SENSOR/FLOW METER

FIELD OF THE INVENTION

This invention relates generally to velocity or speed indicators such as are utilized on marine vessels to determine the velocity of the vessel in the water, wherein the velocity response is substantially linear over the entire velocity range to be expected. The present invention also relates to conditions of fluid flow and provides a flow meter having substantially linear flow velocity over an extremely wide range.

BACKGROUND OF THE INVENTION

Liquid velocity sensors are utilized for a number of differing applications. In the marine industry, especially on recreational marine vessels such as racing yachts, it is desirable to have an extremely fast accurate and linear fluid velocity measurement system which maintains its accuracy over a wide range of velocities. When operating recreational marine vessels such as sailing yachts in conditions of high wind, it is highly desirable to obtain the optimum velocity made good (VMG) from the vessel that can be obtained at any wind condition. Many different vessel adjustments can be made to enhance boat velocity through the water for any wind condition but especially under conditions of low or light wind it is quite difficult to determine that the best velocity is being obtained. It is desirable therefore to provide a fluid velocity indicator that is extremely accurate and quite linear at all conditions of fluid velocity. Upon making an adjustment in the sail or rigging of a vessel it is desirable that the resulting velocity change of the vessel be displayed as soon as possible. This enables the crew of a racing vessel to quickly obtain the best vessel speed (VMG) under any conditions of wind.

For application as speed or velocity sensors in marine vessels, paddle wheel type boat speed sensors have been found reasonably acceptable. The main problem with paddle wheel type fluid velocity sensors is the inability to provide a speed sensor which is accurate and linear in its signal production over a wide range of vessel speeds. One paddle wheel type fluid flow meter sensor that has been utilized as a speed or fluid velocity sensor for marine vessels is constructed in accordance with U.S. Pat. Nos. 4,173,144 and 4,440,030 of Pounder. A vessel speed sensor so constructed however but utilizing permanent magnets within the paddle wheel for generating analog detectable signals which require further signal processing has been found appropriately sensitive and linear only at relatively high fluid velocities. At low fluid velocity the boat speed sensor becomes substantially non-linear and is therefore quite inaccurate. It is desirable therefore to provide a paddle wheel type fluid velocity sensor which is directly digital and effectively provides a linear response at a wide range of fluid velocities, especially including low velocity. It is also desirable to provide a paddle wheel fluid velocity sensor which provides a significant volume of data for each revolution thereof to thus enhance the sensitivity and accuracy of the fluid velocity sensor.

Paddle wheel type velocity sensors are also capable of application as flow sensors. For example, U.S. Pat. No. 4,440,030 is entitled "Fluid Flow Meter" because of its principal application as a fluid flow meter for measurement of the velocity of fluid flow in various flow conduits. U.S. Pat. No. 4,173,144 is directed to a low flow rate transducer construction but requires a housing having a cylindrical paddle wheel chamber. In this form it is not applicable for use as a velocity or speed sensor for marine vessels. It is desirable therefore to provide a fluid flow meter including a paddle wheel type fluid flow sensor which has effective linearity at a wide range of fluid velocities for accuracy of fluid flow measurement even at very low fluid velocities.

SUMMARY OF THE INVENTION

The present invention is directed to an improved paddle wheel type fluid velocity sensor which has effective application as a fluid velocity sensor for boat speed sensing over a wide range of fluid velocities. The present invention also has effective application as a flow meter sensor for measurement of fluid flow in conduits and developing effective accuracy over a wide range of fluid velocities. The flow sensor incorporates a housing structure having a cavity opening to the fluid medium to be sensed. A paddle wheel is mounted for rotation within the cavity of the housing and is positioned such that the various paddles thereof come into contact with the flowing fluid medium. The paddle wheel includes a central shaft portion rotatably supported by a support shaft establishing the axis of rotation of the paddle wheel. A web section of the paddle wheel extends in normal relation from the shaft portion and may be formed integrally with the shaft portion. From the web extends a plurality of equally spaced paddle supports each supporting a paddle blade element located at the radially outer portion thereof. For example, the paddle wheel may incorporate six paddle blades thus providing six data pulses per revolution as compared to one or two pulses which are provided by magnetic paddle wheel sensors. Each of the paddle blade elements is of greater axial length than the width of the web and paddle support and is oriented in substantially parallel relation with the axis of the paddle wheel. The radially inner portions of each of the paddle elements is defined by oppositely tapered surfaces extending from the web and paddle supports to respective axial extremities of the paddle blades. This structure causes each of the paddle blade and paddle supports to form a generally T-shaped configuration. The blades of the paddle wheel are further inclined with respect to the axis of rotation of the paddle wheel and thus establish angles of attack that enhance the sensitivity and response of the paddle wheel to the flowing fluid.

Each of the paddle blades is provided with a signal interrupter projection extending radially outwardly therefrom. An optical fiber circuit is positioned within the housing such that the signal interrupters pass between closely spaced end surfaces of optical fibers and thus interrupt light being transmitted through the optical fiber circuit. Thus, during each revolution of the paddle wheel a number of signal light interruptions or pulses are developed by successive paddle blades such that each signal represents a known angle of paddle rotation. These signals are directly digitally processed electronically to reflect the angular velocity of paddle wheel rotation and thus the velocity of fluid flow. This fluid flow can represent the effect of a marine vessel moving through a body of water or a fluid moving through a conduit. In either case, the velocity of fluid flow is provided electronically and may be instantaneously displayed or recorded.

BRIEF DESCRIPTION OF THE DRAWINGS

So that the manner in which the above recited features, advantages and objects of the present invention as well as others which will become apparent, are attained and can be understood in detail, more particular description of the invention, briefly summarized above, may be had by reference to the embodiment thereof which are illustrated in the appended drawings, which drawings form a part of this specification.

It is to be noted, however, that the appended drawings illustrate only a typical embodiment of this invention and are therefore not to be considered limiting of its scope, for the invention may admit to other equally effective embodiments.

IN THE DRAWINGS

FIG. 1 is a side elevational view shown partly in section showing a fluid velocity sensor in position for measurement of the velocity of a flowing fluid medium;

FIG. 2 is an enlarged sectional view of the fluid flow sensor of FIG. 1 shown 90° from the position illustrated in FIG. 1 and depicting the fiber optic paddle wheel flow sensor in detail;

FIG. 3 is a sectional view of the lower portion of the flow sensor apparatus of FIGS. 1 and 2 shown partially in section and positioned as shown in FIG. 1; and FIG. 4 is a sectional view of the fluid velocity sensor illustrating the process for installing and securing the optical fiber thereof.

FIG. 4A is a bottom view of the insert of FIGS. 1 and 2.

Figure 5:
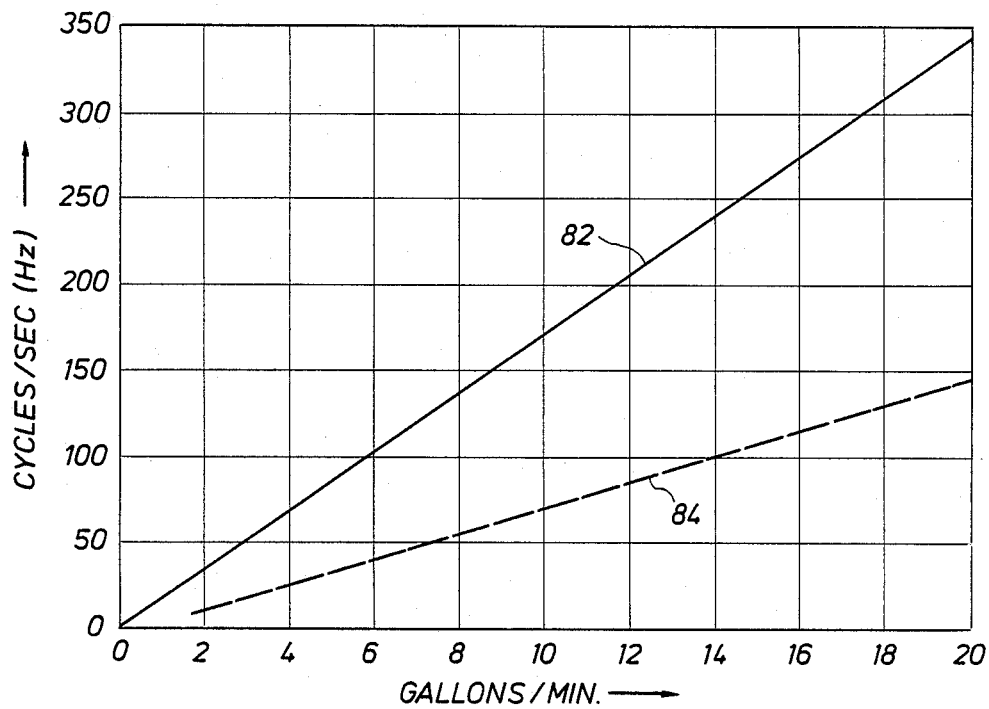

FIG. 5 is the graphical representation of accuracy and linearity of a flow sensor constructed according to the invention in comparison with a commercially available magnetic paddle wheel flow sensor.

Figure 6:
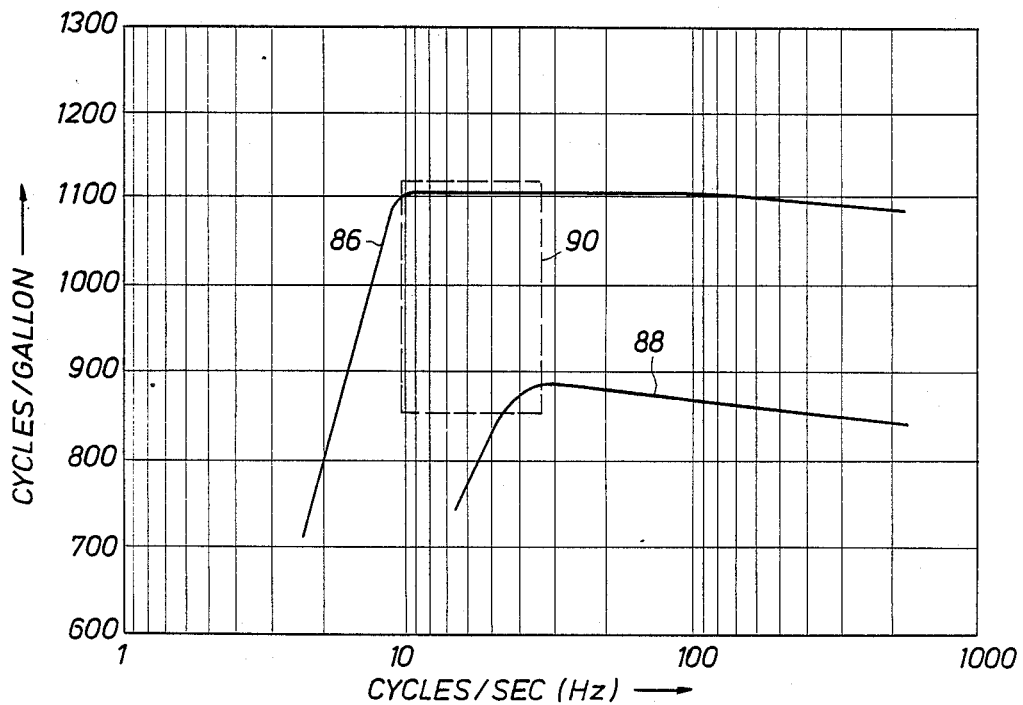

FIG. 6 is the graphical representation of linearity, accuracy and repeatability of a flow sensor constructed according to this invention in comparison with a commercially available magnetic paddle wheel flow sensor.

DETAILED DESCRIPTION OF PREFERRED EMBODIMENT

Referring now to the drawings and first to FIG. 1. A fluid velocity sensor is illustrated generally at 10 which incorporates a housing structure 12 that may be secured in any suitable manner to a structure 14. The structure 14, in the case of velocity sensors for marine vessels may comprise the hull of the vessel for effective sensing of the velocity of vessel movement through the water. In the case of flow meters, the structure 14 may conveniently take the form of a flow conduit within which a fluid product is caused to flow. From the housing 12 extends an optical fiber cable 16 which is coupled with a signal processor P that is capable of processing and displaying signals representing fluid velocity, boat speed, etc The signal processor may take any of a number of suitable forms capable of processing paddle wheel pulses and providing a display in terms of fluid velocity, vessel speed, etc. A pair of optical fiber conductors 18 and 20 extend through the protective conductor 16 with opposed end portions 20 and 22 thereof located within a chamber 24 defined by the housing. The optical fiber conductors may be secured and stabilized within the chamber 24 by any suitable medium. For example, a potting composition 23 may be placed within the housing 24 in its uncured, liquid state and, after curing into a stable mass, will provide effective stabilization and protection of the optical conductors 18 and 20 and stabilize the end portions 18 and 20 against movement within the chamber 24. Each of the optical fiber conductors 20 and 22 incorporates one or more optical fiber elements or strands. End portions 26 and 28 of the respective optical fiber elements are positioned in closely spaced aligned relation within a receptacle 30 formed by a protective insert 31 which is secured by housing structure and potting composition within chamber 24. The housing defines an internal support beam 33 which forms an opening 35 through which a projection 37 of the insert 31 extends. The potting composition in its uncured essentially liquid state flows about the support beam 33, the sides of the insert 31 and about the projection 37. When cured the potting composition retains the insert in fully seated relation within the lower portion of the housing.

One end portion of the housing 12 forms a receptacle 32 within which is rotatably positioned a paddle wheel element shown generally at 34. The paddle wheel is formed by a shaft portion 36 having an axial bore 38 that receives an axial shaft 40. End portions of the shaft 40 are secured within respective openings 42 and 44 defined by an end portion of the housing 12. The shaft 40 therefore defines an axis about which the paddle wheel 34 is freely rotatable. A web structure 46 extends in normal relation from the shaft portion 36 and may be disposed either centrally of the shaft portion as shown in FIG. 2 or in laterally offset relation as is appropriate for the needs of the user. From the web portion 46 extends a plurality of blade supports 48 which may if desired be formed integrally with the web structure as shown, or may be provided in any other suitable manner. At the outer extremities of each of the blade support elements 48 is provided a paddle wheel blade element 50. Each blade element 50 has an axial length that is significantly greater than the axial width of the web and blade support element. As shown in FIG. 2, the axial length of the blade element 50 is only slightly less than the axial length of the shaft portion 36. This particular relationship is not intended as limiting the scope of this invention. The axial length of the paddle wheel elements 50 may be of any suitable relationship with respect to the length of the shaft portion 36. The blade elements 50, if desired, may be formed integrally with the blade support elements 48 as shown in FIGS. 2 and 3 or, in the alternative, may be connected to the blade supports in any suitable manner. Each of the paddle wheel blades is defined by oppositely tapered surfaces 52 and 54 which extend from the point of connection with the respective blade supports to the respective axial extremities of the paddle wheel blade.

Each of the paddle wheel blades and blade supports is of gradually increasing thickness from connection thereof with the web member such that the transverse cross-sectional configuration of the blades is if generally rhomboid configuration and is of greater cross-sectional dimension at the radially outer portion thereof than at the radially inner portion. The blades 48 define diverging surfaces 58 and 60 by virtue of their rhomboid configuration. Surfaces 60 of the blades are inclined with respect to the axis of paddle wheel rotation and thus establish an "angle of attack" with respect to a line or plane extending radially from the axis of paddle wheel rotation. This angle of attack enhances the sensitivity of the paddle wheel sensor to the flowing fluid. Thus it is effectively responsive and accurate at a very wide range of fluid velocities.

Each of the paddle wheel blade elements defines a signal interrupter 56 which is capable of interrupting the light signal passing between the ends 26 and 27 of the optical fibers. In one suitable form of the invention, is illustrated in detail in FIGS. 2 and 3, each paddle wheel blade is provided with a centrally oriented signal interrupted projection 56 which projects radially from each blade to a sufficient distance for interruption of the optical signal passing between the optical fibers. Each of the blade interruptions has an axial width slightly less than the spacing between the ends 26 and 28 of the optical fibers so that the optical fibers are not physically contacted by the signal interrupters. The signal interrupters may be formed integrally with the paddle wheel blades as shown in FIGS. 2 and 3 or, in the alternative, may be provided on the blades in any other suitable manner. As the paddle wheel 34 is rotated by flowing fluid as in the case of flow meters or movement of a vessel through water in the case of velocity sensors for marine vessels, the signal interrupters of each paddle wheel blade will interrupt the light signal being transmitted from one optical fiber member to the other. These several signal interruptions per cycle of paddle wheel rotation are then detected by signal processing circuitry P and are processed to form appropriate digital signals representing the velocity of fluid flow or the velocity of boat movement through the water. These signals may be presented visually such as by way of a digital readout of the signal processing equipment or, in the alternative, may be processed and displayed and/or recorded in any suitable manner appropriate for effective use by operating personnel.

In one form of the invention each of the paddle wheel blades and paddle wheel supports define outwardly diverging surfaces 58 and 60 which are each disposed in angulated relation with respect to the axis defined by the axial shaft 40 in addition to developing a gradually increasing thickness of the paddle wheel blades and blade supports. This feature causes each of the paddle wheel blades to be inclined with respect to the axis about which the paddle wheel rotates and provides spaces between each paddle wheel that expose inclined surfaces of the paddle wheel blades to the direction of fluid flow. These inclined surfaces, together with the generally T-shaped configuration of the paddle wheel blades and supports provides effective fluid contact with the paddle wheel blades to develop efficiently responsive rotation of the paddle wheel. The inclination of the surfaces together with inclined surfaces 52 and 54 allow certain fluid flow about the radially inner portion of each of the blades and thus causes the paddle wheel to be effectively linear at virtually all fluid velocities from very low velocity to very high velocity. When the velocity sensor is employed as a marine vessel velocity indicator the velocity readout of the signal processing equipment will be very accurate even at extremely low vessel speeds, such as typically occur when a sailing vessel is operating in conditions of light wind. When employed as a flow meter, the paddle wheel type sensor hereof will effectively provide accurate liquid velocity signals at a wide range of flow velocities including laminar and turbulent flow.

For installation of optical fibers in a fluid velocity sensor such as that disclosed herein, it is necessary that the closely spaced ends of the optical fibers be accurately positioned with respect to one another to achieve efficient transmission of a light signal from the transmitting fiber to the receiving fiber. It is also necessary that the radius of curvature of the optical fiber be sufficiently great that the resulting optical signal will be of optimum quality. Hence, as shown in FIGS. 2 and 3 the optical fiber has the largest radius of curvature that is allowed by the internal dimension of the housing chamber within which it is positioned. Since the end surfaces of the opposed fibers function essentially as lenses, it is necessary that the end surfaces of the fibers be oriented in precisely normal relation with the run of the fibers and it is also necessary that the opposed end surfaces of the fibers be disposed in aligned, parallel relation. It is further necessary that the end surfaces of the optical fibers be extremely smooth so that they will function as light transmitting lenses. It is also important that the end surfaces of the optical fibers be fully exposed relative to one another. Effective adherence to these features will provide a fiber optic transmission system that is effective, with the light being transmitted without any significant degree of degradation. On the other hand, if these features are not rigidly adhered to, the light signals transmitted between the transmitting and receiving optical fibers will be degraded and the resulting signal processing will be inaccurate or ineffective.

According to the features of this invention, optical fiber installation is accomplished by means of a significantly effective, simple and low cost procedure. The insert 31 is formed to define opposed grooves or slots 66 and 68 within which the lower curved portions of the optical fiber loop are positioned. The optical fiber also extends through opposed aligned passages 70 and 72 which are each in communication with the receptacle 30 and with one of the slots 66. Prior to installation of the insert 31 within the housing the optical fiber is threaded through the aligned passages 70 and 72 and is positioned. A length of optical fiber is inserted through the passages 70 and 72 in such manner that a length of optical fiber bridges across the recess 30 defined by the insert. The optical fiber is placed within each of the slots 66 and 68 and the insert with the optical fiber installed is placed within its mating receptacle in the sensor housing 12. A quantity of a suitable fiber restraining composition is then poured in its liquid uncured state into the housing 12 and fills the various spaces and interstices defined between the insert 31 and the housing. This fiber securing composition also fills the grooves 66 and 68 thus encompassing the optical fibers disposed within the grooves. The fiber securing composition may conveniently take the form of a polymer material such as urethane or an epoxy material or any other suitable composition that may be used for potting electrical components. The fiber securing material after a short time will cure to a stabilized mass thus permanently securing the optical fiber in immovable relation with respect to the insert 61 and the housing 12. After this has been done, the optical fiber is severed at each of the opposed parallel surfaces 78 and 80 of the recess 76 such that the-opposed optical lenses that are formed by the cutting operation are disposed in precisely parallel relation for optimum light transmission and reception. A light signal passing through one of the fibers will be emitted and received by the opposite fiber because of the accurately, aligned, stabilized relationship of the end portion of the fibers. Further, the potting composite will retain the opposed optical fiber ends in immovable relation with the housing and with one another.

The severing operation for cutting out the bridging section 74 of optical fiber may be accomplished by any suitable means. According to the present invention, it has been found practical to cut the optical fiber at the parallel surfaces 78 and 80 by means of a hot cutting instrument such as a knife. Any other cutting instrument may be utilized that is capable of cutting tee optical fiber and leaving smooth end surfaces which are precisely oriented with respect to one another for efficient, non-degraded light transmission therebetween.

After the optical fiber has been cut the paddle wheel is installed with its light signal interrupting projections extending into the recess 30. As each of the signal interrupter projections passes through the recess the optical signal between the opposed optical fiber sections is interrupted. These multiple interruptions per cycle of the paddle wheel are detected by appropriate digital signal processing equipment P and are digitally processed to provide an appropriate signal read out for useful purposes.

It is desirable to position the paddle wheel rotor accurately with respect to the structure 14 and the flowing fluid. The housing 12 is therefore provided with a stop flange 81 that engages the structure and accomplishes such positioning.

The accuracy and linearity of a paddle wheel type fluid velocity sensor constructed in accordance with the present invention is depicted graphically in FIG. 5 by the curve presented in full line. This accuracy and linearity is compared to the accuracy and linearity of a magnetic transducer which is shown by the curve illustrated in broken line. The graphical representation of FIG. 5 was achieved in a comparative test where a paddle wheel type fluid velocity transducer constructed in accordance with the present invention and a conventional commercially available magnetic transducer were tested throughout a velocity range of from 0 to 350 cycles per second and at a fluid velocity range of from 0 to 20 gallons per minute. During this test water was utilized as they flowing fluid medium. The fluid velocity sensor according to this invention established a curve as shown in full line at 82, which curve is substantially straight, indicating good linearity. Curve 82 is disposed at substantially 45°, thus indicating that for increases in flow a substantially directionally proportion increase in paddle wheel velocity was observed. The conventional flow meter sensor developed a data curve illustrated in broken lines at 84 which did not exhibit a directly proportional increase in fluid velocity and paddle wheel velocity. The full line curve 82 established by the fluid flow sensor of this invention was developed by a flow meter having a ½ inch flow body. An accuracy of 1% of flow rate with 0.5% repeatability is depicted by the substantially linear curve 82. The magnetic transducer also had a ½ inch flow body and established an accuracy of 3.5% of flow rate at 1.0% repeatability.

Referring now to the graphical representation of FIG. 6, a comparative test was conducted for determination of linearity, accuracy and repeatability of a fluid sensor constructed in accordance with the present invention and a conventional, commercially available, magnetic fluid sensor of the same flow body dimension. On a log-log scale, the flow meter of the present invention exhibited a curve shown in full line at 86 while a curve shown in broken line at 88 was established by the magnetic flow sensor. The rectangular area 90 identifies the extended linear range that was established by the fiber optic flow transducer of the present invention in comparison with the magnetic flow transducer. In this case, water was utilized as the flowing fluid medium and the data points indicate cycles of paddle wheel rotation per gallon and cycles of paddle wheel rotation per second. In this case the fiber optic fluid flow transducer of the present invention exhibited a linearity of 2% throughout a range of from 10 to 350 cycles per second with an accuracy of 1% of flow rate and a repeatability of 0.5%. In comparison the magnetic flow transducer exhibited a 2% linearity throughout a range of from 40–350 cycles per second with an accuracy of 3.5% of flow rate and a repeatability of 1.0%. It is clear from this graphical representation that the linearity, accuracy and repeatability of a flow transducer according to this invention is substantially linear at all ranges and has enhanced accuracy and repeatability at very low flow rates.

In view of the foregoing, it is quite clear that the present invention provides a novel fluid velocity sensor which is quite effective for use as velocity sensors for marine vessels and velocity sensors for detecting fluid flow in conduits. The velocity sensor is quite accurate at a wide range of fluid velocities and is quite linear in graphical performance at a full range of fluid velocities. The present invention is therefore well adapted to attain all of the features and advantages hereinabove set forth together with other advantages which will become obvious and inherent from a description of the apparatus itself. It will be understood that certain combinations and sub-combinations are of utility and may be employed without reference to other features and sub-combinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

What is claimed is:

1. An optical fiber/paddle wheel fluid velocity sensor, comprising:
   (a) housing means forming a cavity opening toward a source of flowing fluid and forming a sensing recess opening into said cavity;
   (b) a paddle wheel supported for rotation within said cavity with a portion thereof protruding from said cavity for contact by said flowing fluid, said paddle wheel comprising:
      (1) shaft means forming an axis about which said paddle wheel rotates, said shaft means being supported by said housing means;
      (2) a web member extending from said shaft means and being disposed in substantially normal relation with said shaft means;
      (3) a plurality of blade support elements extending from said web member;
      (4) a plurality of elongate paddle blade elements being supported by respective blade supports and having an axial length exceeding the axial thickness of said web member; and
      (5) a plurality of sensors being defined by respective ones of said paddle blade elements and extending radially from the outer portion of each of said paddle blade elements, said sensors moving through said sensing recess upon rotation of said paddle wheel; and
   (c) fiber optic digital detector means including an optical fiber light conductor circuit intersecting said sensing recess and transmitting a light signal that is sequentially interrupted by said plurality of sensors thus detecting passage of each of said sensors and providing a detecting passage of each of said sensors and providing a detector signal representing an increment of rotational movement of said paddle wheel, said detector signals being digitally processed electronically to indicate the velocity of fluid flow.

2. A fiber optic/paddle wheel flow meter as recited in claim 1 wherein:
 (a) said fiber optic detector means includes a pair of fiber optic elements with end portions thereof positioned in closely spaced, aligned relation within said sensor recess of said housing means; and
 (b) each of said sensors form light signal interrupter means which pass between said closely spaced ends of said optical fibers during each revolution of said paddle wheel.

3. A fiber optic/paddle wheel flow meter as recited in claim 1 wherein each of said elongated paddle blade elements forms oppositely taped surfaces at the radially inner portions thereof, said tapered surfaces extending from respective ends of said elongate paddle blade elements to said paddle supports.

4. A fiber optic/paddle wheel flow meter as recited in claim 1 wherein said paddle wheel is an integral construction forming said shaft means, web member, elongate paddle blade elements and sensor means.

5. A fiber optic/paddle wheel flow meter as recited in claim 1 wherein each of said plurality of elongate paddle blade elements and said blade supports is oriented in offset angular relation with respect to the axis about which said paddle wheel rotates.

6. A fiber optic/paddle wheel flow meter as recited in claim 1 wherein each of said elongate paddle blade elements and its support means forms a T-shaped paddle blade configuration extending from said web member, said elongate paddle blade elements each being disposed in spaced relation with said shaft means.

7. A paddle wheel construction for fluid velocity sensors, comprising:
 (a) shaft means comprising an axis about which said paddle wheel rotates;
 (b) a web member extending substantially centrally of said shaft means and being disposed in substantially normal relation with said shaft means, said web member forming a plurality of blade supports;
 (c) a plurality of equally spaced paddle elements extending radially from respective ones of said blade supports of said web means and being oriented in substantially parallel spaced relation with said shaft means, each of said paddle elements being of greater axial length than the thickness of said web means and forming oppositely tapered surfaces extending from respective ends of said paddle blade elements to said blade supports; and
 (d) sensor projection means extending radially from each of said paddle elements and adapted for interruption of an optical signal passing between closely spaced optical fibers.

8. A paddle wheel construction as recited in claim 7 wherein each of said paddle blade elements forms a wedge shape cross-sectional configuration being of greater dimension at the radially outer portion thereof than at the radially inner portion, each of said paddle blade elements are oriented in angulated relation with respect to the axis of said paddle wheel construction.

9. A paddle wheel construction as recited in claim 8 wherein said sensor projection means extends radially from the central portion of each of said paddle elements and is capable of passing between closely spaced optical fibers upon each revolution of said paddle wheel construction for interruption of the light signal passing therebetween.

10. A paddle wheel construction as recited in claim 9 wherein:
 (a) said shaft means forms an axial passage; and
 (b) an axial shaft is received within said axial passage and supports said paddle wheel construction for rotation.

11. An optical fiber/paddle wheel fluid velocity sensor, comprising:
 (a) housing means forming a cavity opening toward a source of flowing fluid;
 (b) a paddle wheel supported for rotation within said cavity with a portion thereof protruding from said cavity for contact by said flowing fluid, said paddle wheel comprising:
  (1) shaft means forming an axis about which said paddle wheel rotates, said shaft means being supported by said housing means;
  (2) a web member extending from said shaft means and being disposed in substantially normal relation with said shaft means;
  (3) a plurality of blade support elements extending from said web member;
  (4) a plurality of elongate paddle blade elements being supported by respective blade supports and having an axial length exceeding the axial thickness of said web member, each of said paddle blade elements forming oppositely tapered surfaces at the radially inner portion thereof, said tapered surfaces extending from respective ends of said elongated paddle blade elements to said paddle supports; and
  (5) sensor means being defined by each of said paddle blade elements; and
 (c) fiber optic digital detector means detecting passage of each of said sensor means and providing a detector signal representing an increment of rotational movement of said paddle wheel, said detector signals being digitally processed electronically to indicate the velocity of fluid flow.

12. A fiber optic/paddle wheel flow meter as recited in claim 11 wherein each of said sensor means comprises a signal interrupter projection extending radially outwardly from each of said elongate paddle wheel elements, said digital signal interrupter projection being adapted to interact with said fiber optic detector means to interrupt the transmitted light signal during the passage of each elongate paddle blade element relative to said fiber optic detector means.

13. A fiber optic/paddle wheel flow meter as recited in claim 11 wherein said paddle wheel is an integral construction forming said shaft means, web member, elongate paddle blade elements and sensor means.

14. A fiber optic/paddle wheel flow meter as recited in claim 11 wherein each of said plurality of elongate paddle blade elements and said blade supports is oriented in offset angular relation with respect to the axis about which said paddle wheel rotates.

15. A fiber optic/paddle wheel flow meter as recited in claim 11 wherein each of said elongate paddle blade elements and its support means forms a T-shaped paddle blade configuration extending from said web member, said elongate paddle blade elements each being disposed in spaced relation with said shaft means.

16. A paddle wheel construction as recited in claim 11 wherein each of said paddle blade elements forms a wedge shape cross-sectional configuration being of greater dimension at the radially outer portion thereof than at the radially inner portion, each of said paddle blade elements are oriented in angulated relation with respect to the axis of said paddle wheel construction.

17. A paddle wheel construction as recited in claim 16 wherein said sensor projection means extends radially from the central portion of each of said paddle elements and is capable of passing between closely spaced optical fibers upon each revolution of said paddle wheel construction.

* * * * *